US010244575B2

(12) United States Patent
Rahman

(10) Patent No.: US 10,244,575 B2
(45) Date of Patent: Mar. 26, 2019

(54) VOICE OVER LONG TERM EVOLUTION (VOLTE) NETWORK PERFORMANCE

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/389,339

(22) Filed: Dec. 22, 2016

(65) Prior Publication Data

US 2018/0184466 A1  Jun. 28, 2018

(51) Int. Cl.
| | |
|---|---|
| *H04W 8/12* | (2009.01) |
| *H04W 76/19* | (2018.01) |
| *H04L 29/06* | (2006.01) |
| *H04L 12/14* | (2006.01) |
| *H04W 76/32* | (2018.01) |
| *H04M 15/00* | (2006.01) |
| *H04W 4/24* | (2018.01) |
| *H04L 29/08* | (2006.01) |

(52) U.S. Cl.
CPC ......... *H04W 76/19* (2018.02); *H04L 12/1407* (2013.01); *H04L 65/1016* (2013.01); *H04L 65/1066* (2013.01); *H04L 67/143* (2013.01); *H04M 15/66* (2013.01); *H04W 4/24* (2013.01); *H04W 76/32* (2018.02); *H04L 65/1006* (2013.01); *H04L 65/608* (2013.01)

(58) Field of Classification Search
CPC ... H04W 36/0022; H04W 24/08; H04W 4/24; H04W 76/16; H04W 76/19; H04W 48/20; H04W 76/25; H04W 36/0066; H04L 65/608; H04L 65/105
See application file for complete search history.

(56) References Cited

U.S. PATENT DOCUMENTS

| | | | | |
|---|---|---|---|---|
| 8,718,636 | B1 * | 5/2014 | Pankajakshan | H04W 24/08 455/403 |
| 2012/0017002 | A1 * | 1/2012 | Andreasson | H04L 43/0811 709/231 |
| 2016/0191631 | A1 * | 6/2016 | Haraszti | H04L 67/14 709/227 |
| 2016/0373585 | A1 * | 12/2016 | Sharma | H04W 76/38 |
| 2017/0201414 | A1 * | 7/2017 | Shin | H04L 41/0686 |

* cited by examiner

*Primary Examiner* — Mohamed A Kamara
(74) *Attorney, Agent, or Firm* — Knobbe, Martens, Olson & Bear, LLP

(57) ABSTRACT

Systems, methods, and computer-readable media are disclosed for managing performance of communications over a Voice over Long Term Evolution (VoLTE) network. A packet flow associated with a VoLTE call may be monitored, and an interruption in the packet flow that exceeds a threshold duration may be determined to be an abnormal termination of the VoLTE call. Information regarding the abnormal VoLTE call termination may be propagated through various network platforms to an enhanced Node B (eNB), where an abnormal VoLTE call termination event may be logged. The abnormal VoLTE call termination event may be utilized when analyzing the performance of the VoLTE network.

21 Claims, 5 Drawing Sheets

VOICE OVER LONG TERM EVOLUTION (VOLTE) NETWORK PERFORMANCE

BACKGROUND

Generally described, computing devices can be used to exchange information via a network. For example, mobile computing devices may utilize a network provided by a wireless service provider to facilitate the exchange of information in accordance with one or more wireless communication protocols. For example, a wireless service provider may maintain a wireless network that enables mobile computing devices to exchange information in accordance with a fourth-generation wireless telecommunications protocol, such as the Long Term Evolution ("LTE") protocol.

A wireless service provider may further enable network communications via protocols that are based on the LTE protocol, and mobile computing devices may utilize these protocols to facilitate the exchange of information. For example, a wireless service provider may maintain a network of wired and wireless components that implement the Voice over LTE ("VoLTE") protocol, enabling mobile computing devices to send and receive voice communications using packet-based Internet Protocol ("IP") networking rather than traditional circuit-based networking. The wireless service provider may implement an architectural framework, such as an IP Multimedia Subsystem ("IMS"), for delivering IP-based communications to users of mobile computing devices over various types of networks. Various nodes within the wireless service provider's network may communicate using various protocols in order to implement VoLTE services and functionality.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
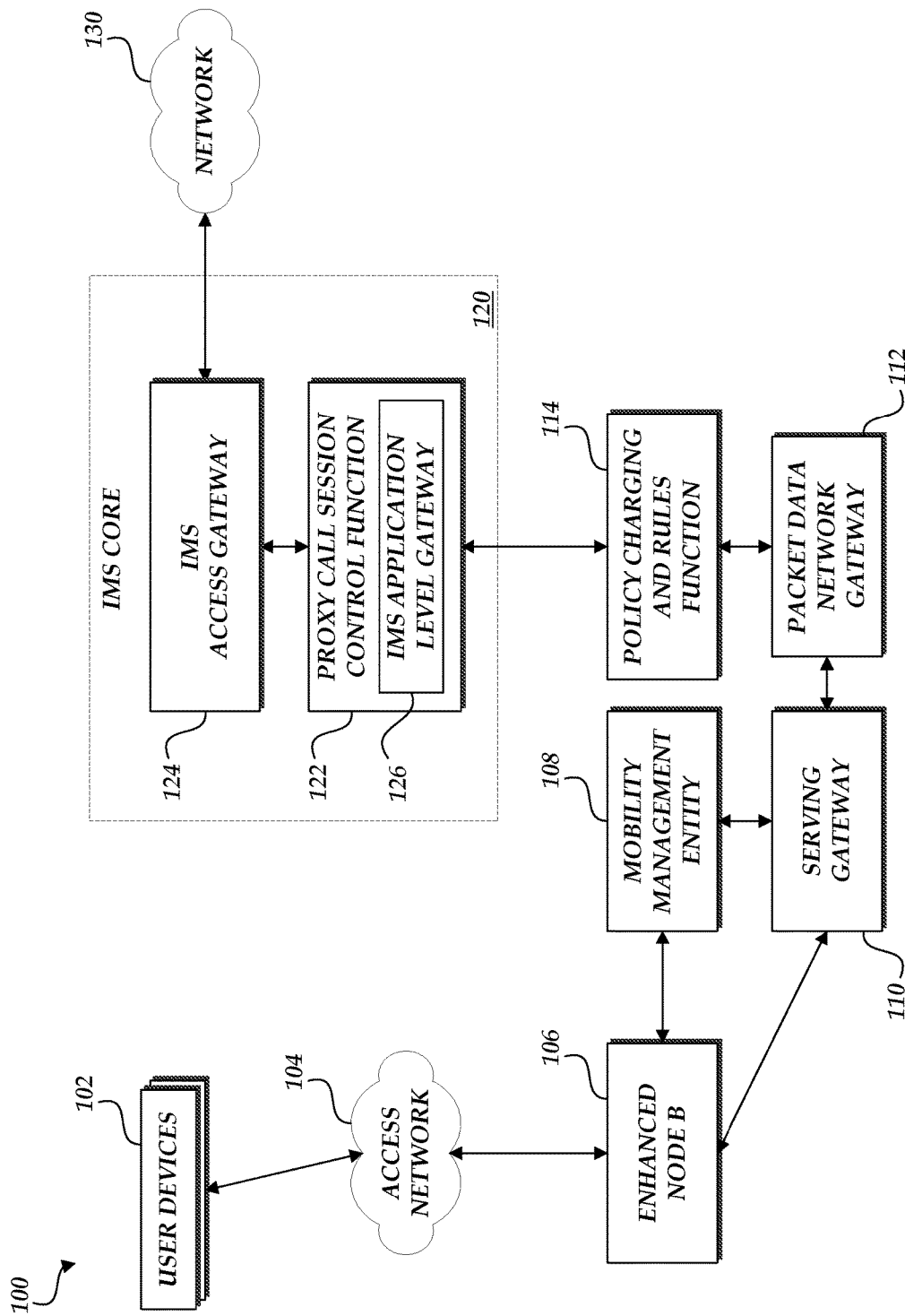
FIG. 1 is a block diagram of an exemplary network environment that provides telecommunications services in accordance with the VoLTE protocol.

Generally described, aspects of the present disclosure relate to wireless telecommunications. More specifically, aspects of the present disclosure are directed to systems, methods, and computer-readable media related to detecting and processing abnormal terminations of VoLTE calls. Illustratively, a wireless service provider may facilitate communications between a first party using a mobile computing device (referred to herein as a "user device" or "user equipment") and a second party or parties, who may be using mobile computing devices, telecommunications devices, or other computing devices. The wireless service provider may facilitate these communications by providing a wireless telecommunications network, which may include various network elements, and which may implement the VoLTE protocol by facilitating transmission and receipt of packet data flows between the user device, the network elements, and the other party or parties to the call.

The wireless service provider may monitor performance of its network by collecting various service measurements and relating them to the performance of various network elements. For example, the wireless service provider may collect service measurements relating to a number of packets transmitted or received within a specified time period, a number of calls originated and terminated within the time period, and the like. The wireless service provider may further relate these service measurements to geographic areas covered by the wireless telecommunications network, or to particular network elements that provide network coverage in a specified geographic area. However, the service measurements collected for a particular packet flow, such as a packet flow associated with a VoLTE call, may be collected at a network element that is centrally located, such as a gateway or firewall at a network boundary. The wireless service provider may thus be unable to determine the performance of network elements in direct communication with user devices, as the metrics captured at the central location cannot be associated with the network elements in question.

To improve the functionality of the wireless telecommunications network, the wireless service provider may implement VoLTE dropped call detection and processing that enables associating an event, such as an abnormal VoLTE call termination, with a decentralized network element or elements that are in communication with user devices. The VoLTE dropped call detection and processing may collect information regarding the dropped call to facilitate root cause analysis and make the network's performance characteristics more readily understandable.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1 is a block diagram of an exemplary network environment 100 for providing VoLTE services. The network environment 100 may include a number of user devices 102, each associated with a user. The user devices 102 may correspond to a wide variety of devices or components that are capable of initiating, receiving or facilitating communications over a communication network in accordance with the VoLTE standard. For example, the user devices 102 may include personal computing devices, electronic book readers (e.g., e-book readers), handheld computing devices, integrated components for inclusion in computing devices, home electronics, appliances, vehicles, machinery, landline telephones, network-based telephones (e.g., VoIP phones), cordless telephones, cellular telephones, smartphones, modems, personal digital assistants, laptop computers, gaming devices, media devices, and the like. In an illustrative embodiment, the user devices 102 include a wide variety of software and hardware components for establishing communications over one or more communication networks, including one or more access networks 104 or other private or public networks such as network 130.

The user devices 102 may be communicatively connected via the access network 104. Illustratively, the access network 104 may be an Evolved Universal Terrestrial Radio Access (E-UTRAN) network. In some embodiments, the access network 104 is distributed over land areas, each of which is served by at least one fixed-location transceiver known as an enhanced Node B ("eNB") 106. As used herein, the term "cell" may refer interchangeably to an eNB 106 itself or to the land area served by an eNB 106. The eNB 106 includes radio transceivers that provide the cell with network coverage, and which can be used for transmission of voice, messages, or other data. An eNB 106 may use a different set of frequencies from neighboring cells, to avoid interference and provide guaranteed service quality within each cell. When joined together, the eNBs 106 provide radio coverage over a wide geographic area. This enables a large number of user devices 102 to communicate via the fixed-location transceivers. Although the access network 104 is illustrated as a single network in FIG. 1, one skilled in the relevant art will appreciate that the access network may include any number of public or private communication networks and/or network connections. Further, although a single eNB 106 is depicted in FIG. 1, one skilled in the relevant art will understand that the access network 104 may include multiple eNBs 106.

The network environment 100 further includes a mobility management entity (MME) 108 and a serving gateway ("SGW") 110 in communication with the eNB 106. Generally described, the MME 108 may be a computing device having a processor and other hardware and software components that implement aspects of the present disclosure. Similarly, the SGW 110 may be a computing device having a processor and other hardware and software components that implement aspects of the present disclosure. In the illustrated embodiment, the MME 108 communicates with the eNB 106 to control delivery of communications services (e.g., by authenticating user devices 102, activating and deactivating bearers, etc.), and the SGW 110 communicates with the eNB 106 to deliver the content of communications. The SGW 110 is also in communication with a packet data network gateway ("PGW") 112, which provides connectivity between user devices 102 and external packet data networks. In some embodiments, the SGW 110 and PGW 112 may be combined into a single network element. In other embodiments, the PGW 112 may be a separate computing device having its own processor and other hardware and software components. The network environment 100 further includes a policy charging and rules function ("PCRF") 114, which provides policy control decisions and flow-based charging control decisions. For example, the PCRF 114 may determine how a particular service data flow will be treated in the PGW 112 (e.g., it may determine that the PGW 112 will ensure that the data flow meets a Quality of Service ("QoS") requirement). In various embodiments, the PCRF 114 may be a separate computing device having a processor and other hardware and software components, or may be combined with other network elements depicted in FIG. 1. Collectively, the MME 108, SGW 110, PGW 112, and PCRF 114 may be described as components of an Evolved Packet Core ("EPC") network. One skilled in the art will appreciate that an EPC network may include more components than those depicted in FIG. 1, and that the present disclosure is not limited to the subset of EPC network elements disclosed in FIG. 1.

The network environment 100 further includes an IP Multimedia System ("IMS") core network 120, which includes a proxy call session control function ("P-CSCF") 122, an IMS access gateway ("IMS-AGW") 124, and an IMS application level gateway ("IMS-ALG") 126. In various embodiments, the P-CSCF 122 may be a separate computing device having a processor and other hardware and software components, or may be combined with other network elements depicted in FIG. 1. The IMS-AGW 124 provides a gateway to external public or private networks, such as the network 130, and may similarly be implemented as an independent computing device having hardware and software components or may be combined with other network elements depicted in FIG. 1. The IMS-ALG 126 may be implemented as a component of the P-CSCF 122, as illustrated, or in some embodiments may be a separate computing device having a processor and other hardware and software components. One skilled in the relevant art will appreciate that an IMS core network 120 may include more components than those depicted in FIG. 1, and that the present disclosure is not limited to the subset of IMS core network 120 elements disclosed in FIG. 1. For example, in some embodiments, a transition gateway ("TrGW") may perform functions described herein with reference to the IMS-AGW 124, or an IMS border control function ("IBCF") may perform functions described herein with reference to the P-CSCF 122.

Figure 2:
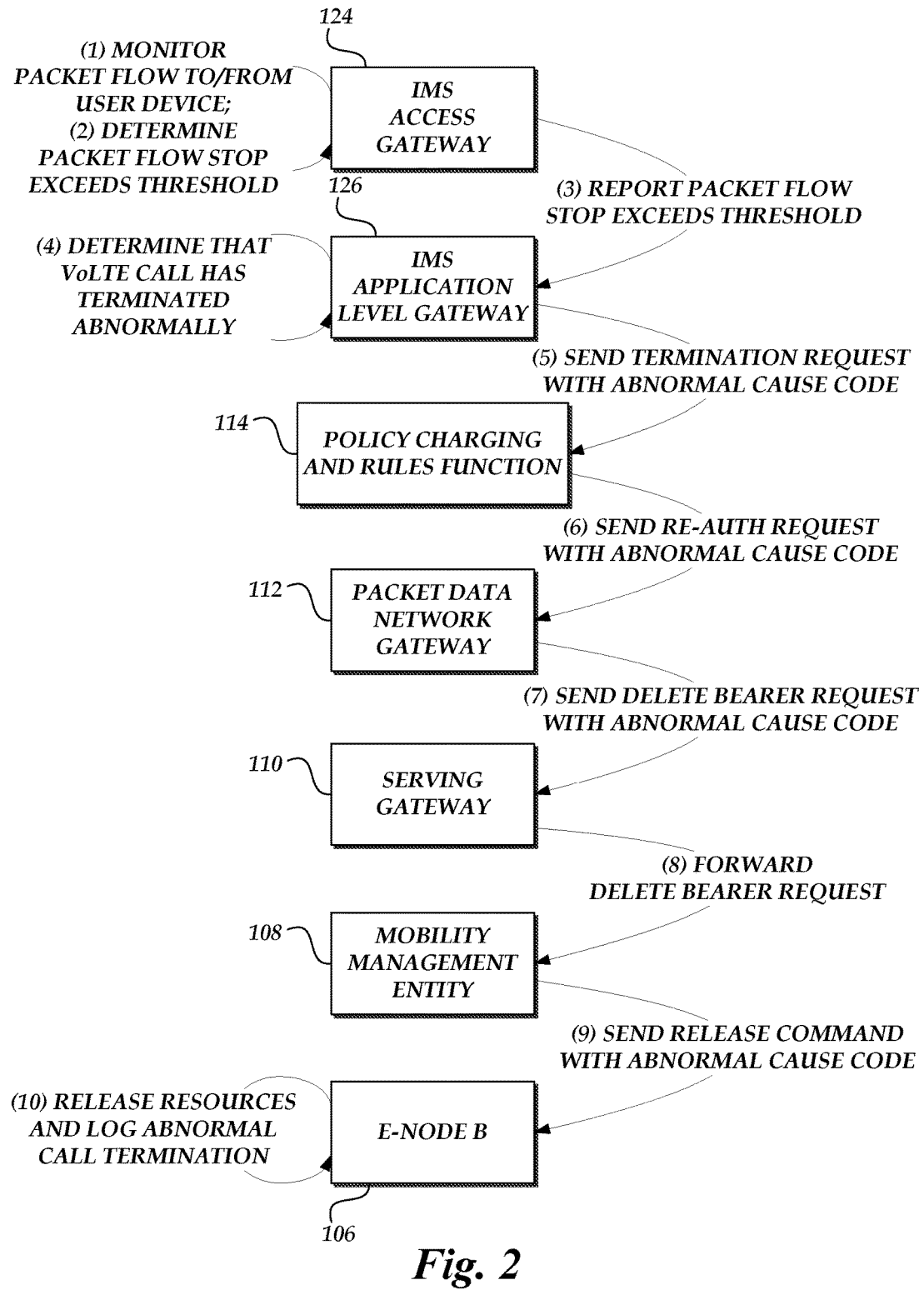
FIG. 2 is an exemplary block diagram depicting detection and logging of an abnormal VoLTE call termination in accordance with aspects of the present disclosure.

FIG. 2 is an exemplary block diagram depicting detection and logging of an abnormal VoLTE call termination in the network environment 100 of FIG. 1. In the illustrated embodiment, a IMS-AGW 124 at (1) may monitor packet flows associated with a VoLTE call. The packet flows may illustratively be Real-Time Transport Protocol ("RTP") packet flows to and from a user device 102 of FIG. 1, and may be associated with a Session Initiation Protocol ("SIP") session that carries the traffic associated with the VoLTE call. The IMS-AGW 124 may monitor packet flow in an "upstream" direction (e.g., packets sent from the user device 102 to a third party via the network 130) as well as a "downstream" direction (e.g., packets sent from the third party to the user device 102 via the network 130). At (2), the IMS-AGW 124 may determine that one or more of the RTP packet flows has stopped for a length of time exceeding a threshold. For example, the IMS-AGW 124 may determine that no RTP packets have been received from the user device 102 in the past N seconds, where N is a predetermined threshold duration.

At (3), the IMS-AGW 124 may report to the IMS-ALG 126 that the packet flow has stopped. In some embodiments, the IMS-AGW 124 may transmit a SIP NOTIFY message, using a protocol such as the H.248/Megaco gateway control protocol, containing an "IP STOP" event to indicate that a packet flow has stopped for at least the predetermined interval. In other embodiments, the IMS-AGW 124 may transmit any other indication or notification that conveys to the IMS-ALG 126 that the packet flow has stopped. At (4), the IMS-ALG 126 analyzes the information received from the IMS-AGW 124 and determines that the VoLTE call has terminated abnormally. In some embodiments, the IMS-AGW 124 may send multiple messages relating to the same packet flow, such as a messages indicating that the packet flow has stopped for progressively longer intervals, and the IMS-ALG 126 may determine that the VoLTE call terminated abnormally based on, for example, cumulative interruptions of the packet flow. In further embodiments, the IMS-ALG 126 may determine that a packet flow interruption preceded a user-initiated call termination, and may determine that the VoLTE call terminated abnormally or suboptimally depending on a duration of the packet flow interruption.

At (5), the IMS-ALG 126 may transmit a notification to the PCRF 114 that the VoLTE call terminated abnormally. For example, the IMS-ALG 126 may transmit a Diameter session termination request ("STR") including a cause code that indicates abnormal call termination. As a further example, the IMS-ALG 126 may transmit a STR containing an attribute-value pair ("AVP") (e.g., a Termination-Cause AVP or an Experimental-Result-Code AVP) that denotes an abnormal VoLTE call termination. One skilled in the art will understand that the present disclosure is not limited to any particular forms of notifications between network elements, and that, for example, the IMS-ALG 126 may communicate the abnormal VoLTE call termination to the PCRF 114 via any message or protocol.

At (6), the PCRF 114 may communicate the abnormal VoLTE call termination to the PGW 112. In some embodiments, the PCRF 114 may perform additional processing in response to the abnormal VoLTE call termination, such as releasing resources or collecting and reporting information related to the abnormally terminated VoLTE call. The PCRF 114 may, in some embodiments, communicate the abnormal VoLTE call termination by sending a Diameter Re-Auth Request ("RAR") command to the PGW 112, which in further embodiments may contain an Event-Trigger AVP that indicates abnormal VoLTE call termination. At (7), the PGW 112 communicates the abnormal VoLTE call termination to the SGW 110. The PGW 112 may also perform additional processing as described above. In some embodiments, the PGW 112 may communicate the abnormal VoLTE call termination by sending an Evolved General Packet Radio Service (GPRS) Tunneling Protocol for Control Plane (GTPv2-C) Delete Bearer Request to the SGW 110, which in further embodiments may contain a Cause value that indicates abnormal VoLTE call termination.

At (8), the SGW 110 may forward the notification received from the PGW 112 to the MME 108. In some embodiments, the SGW 110 may send a notification that is distinct from the one received from the PGW 112, may modify information contained in the notification, or may otherwise process the notification and send a processed notification to the MME 108. The SGW 110 may also perform additional processing of the abnormal VoLTE call termination, as described above.

At (9), the MME 108 may send a command to the eNB 106 that indicates the VoLTE call terminated abnormally. In some embodiments, MME 108 may send an E-UTRAN Radio Access Bearer ("E-RAB") Release Command via the S1 Application Protocol ("S1AP"), which in further embodiments may contain a cause code that indicates abnormal VoLTE call termination. At (10), the eNB 106 processes the command to release the resources associated with the VoLTE call, and logs that the VoLTE call terminated abnormally in a log. Capturing the abnormal VoLTE call termination event at the eNB 106 level improves the functioning of the VoLTE network by relating abnormal VoLTE call terminations to particular eNBs 106, thereby enabling resolutions of issues at particular eNBs 106 that are responsible for the abnormal terminations. For example, a particular eNB 106 may report an unusually high number of abnormal VoLTE call terminations during a time interval corresponding to peak traffic on the eNB 106, which in turn may support a determination that the eNB 106 is under-resourced and enable provisioning of additional resources.

Figure 3A:
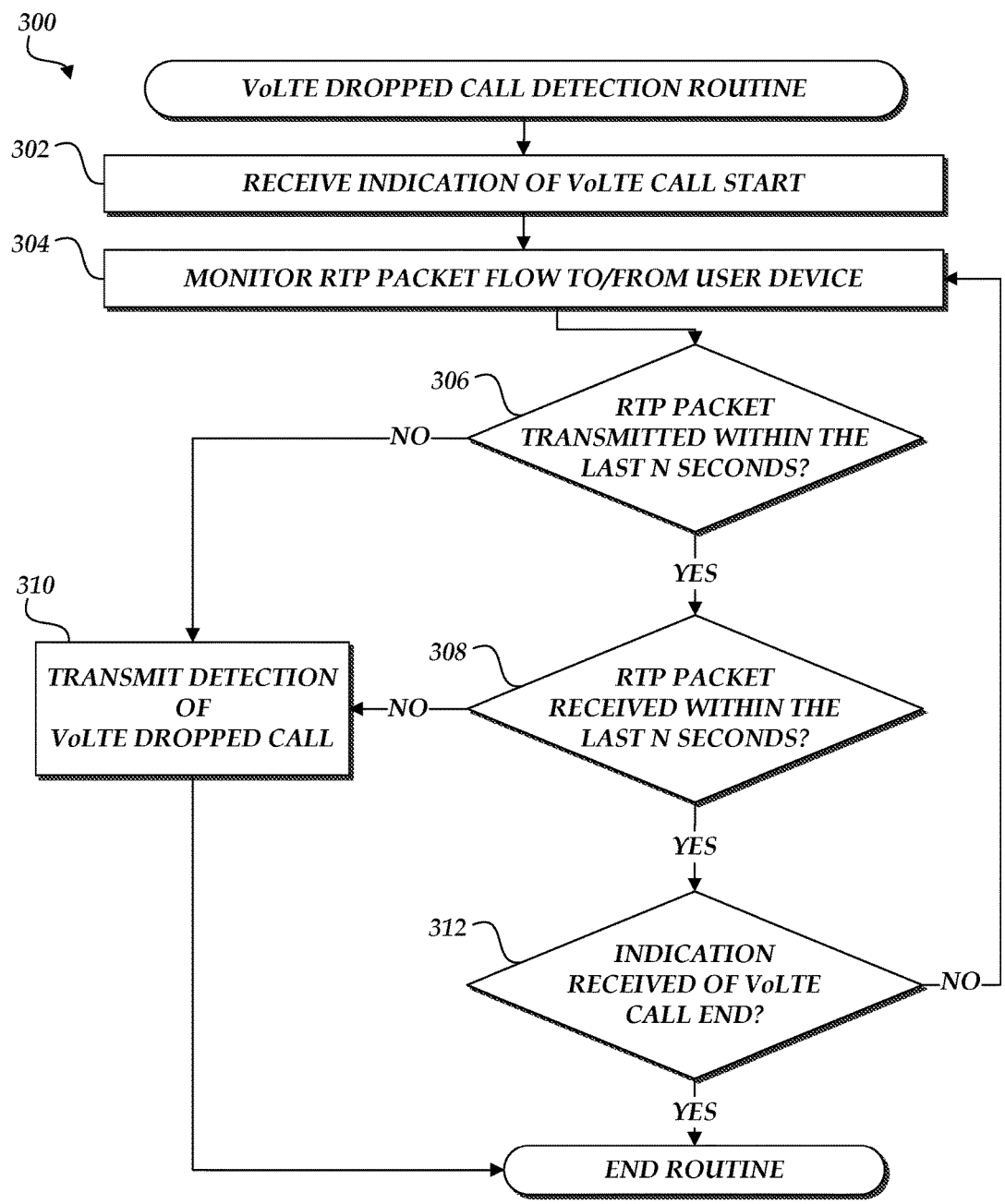
FIG. 3A is a flow diagram depicting an exemplary VoLTE dropped call detection routine illustratively implemented in the network environment of FIG. 1.

FIG. 3A is a flow diagram depicting an illustrative VoLTE dropped call detection routine 300. The routine 300 may be carried out, for example, by the IMS-AGW 124 and/or the IMS-ALG 126 of FIG. 1. At block 302, an indication may be received of the start of a VoLTE call. Illustratively, the indication may be an instruction to begin monitoring RTP packet flows, a subscription to a notification service regarding RTP packet flow interruptions, an instruction to allocate resources to a VoLTE call, or other indications.

At block 304, RTP packet flows to and from the user device may be monitored. For example, packet flows may be monitored by storing times at which a packet associated with the VoLTE call was last transmitted to or received from the user device. As a further example, a number of packets received within a duration, such as the number of packets received within the last ten seconds, may be monitored.

At decision block 306, a determination may be made as to whether an RTP packet has been transmitted to the user device within the past N seconds, where N is a predetermined threshold number. If the determination is that no RTP packets have been transmitted to the user device within the past N seconds, then at block 310 detection of a VoLTE dropped call may be transmitted. In various embodiments, detection of a VoLTE dropped call may be transmitted from the IMS-AGW 124 to the IMS-ALW 126, from the IMS-ALW 126 to the PCRF 114, or between other network elements. In some embodiments, the IMS-AGW 124 may transmit information regarding RTP packet flows to the IMS-ALW 126, which may determine that the VoLTE call has dropped based upon the received information. The routine 300 then ends.

If the determination at decision block 306 is that at least one RTP packet has been transmitted to the user device within the past N seconds, then at decision block 308 a determination may be made as to whether an RTP packet has been received from the user device within the past N seconds. In some embodiments, different thresholds may be used in decision blocks 306 and 308, and the threshold duration for deciding that a packet flow has been interrupted may vary between the transmit path and the receive path. If the determination at decision block 308 is that no packets have been received within the last N seconds, then the routine 300 branches to block 310 and proceeds as described above.

If the determination at decision block 310 is that at least one RTP packet has been received from the user device within the last N seconds, then at decision block 312 a determination may be made as to whether an indication of the end of the VoLTE call has been received. Illustratively, the indication may be an instruction to cease monitoring, an unsubscription from a notification service, an instruction to release resources associated with the VoLTE call, or another indication of the end of the VoLTE call. If the determination at decision block 312 is that an indication of the end of the VoLTE call has been received, then the routine 300 ends. If not, then the routine 300 branches to block 304 and continues monitoring the RTP packet flows.

One skilled in the art will appreciate that the illustrated routine 300 is provided for purposes of example, and that the present disclose includes numerous variations on routine 300 within its scope. For example, decision blocks 306, 308, and 312 may be carried out in any order. As a further example, in some embodiments, decision blocks 306 and 308 may be combined and a determination may be made as to whether an RTP packet has been either transmitted or received within the last N seconds. Still further, although FIG. 3A is described in terms of RTP packet flows, the present disclosure is applicable to other packet flows and to other techniques for monitoring delivery of VoLTE packets.

Figure 3B:
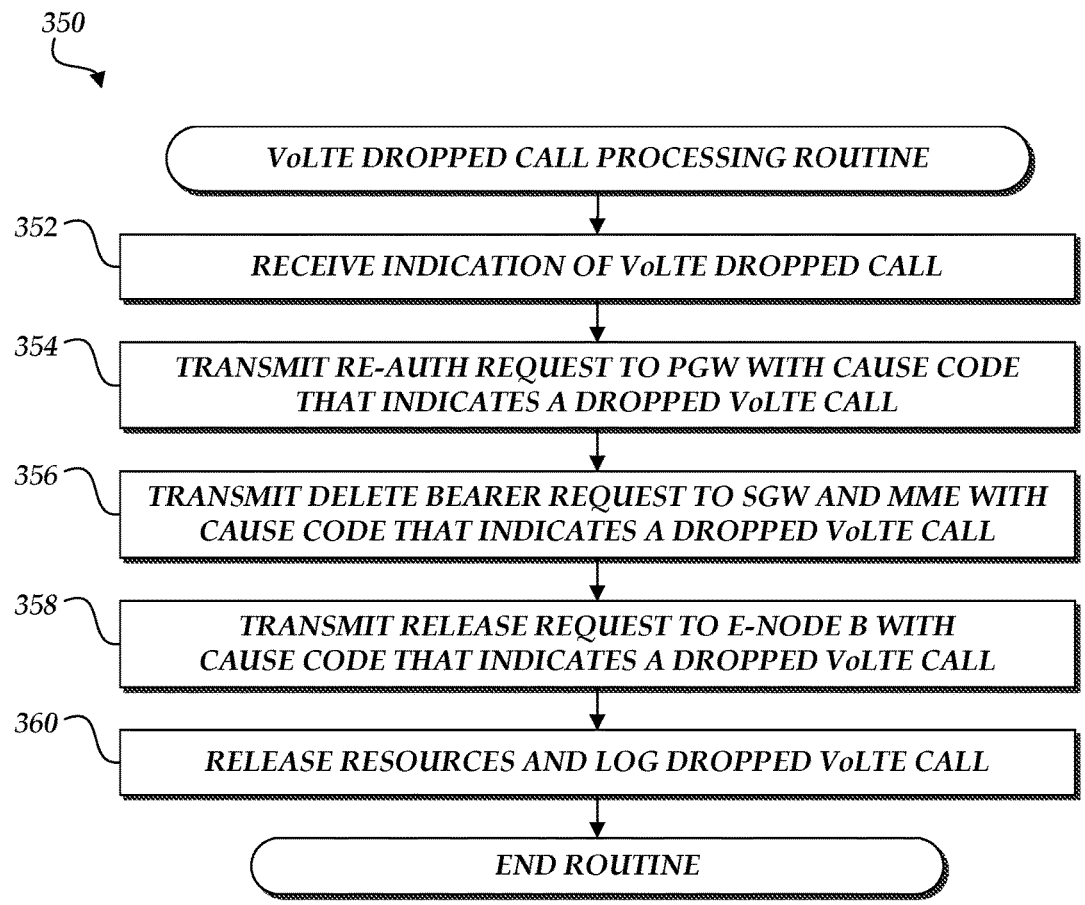
FIG. 3B is a flow diagram depicting an exemplary VoLTE dropped call processing routine illustratively implemented in the network environment of FIG. 1.

Turning now to FIG. 3B, an illustrative VoLTE dropped call processing routine 350 will be described. The routine 350 may be carried out by, for example, the IMS-ALG 126, the PCRF 114, the PGW 112, the SGW 110, the MME 108, the eNB 106, and/or various combinations thereof. At block 352, an indication of an VoLTE dropped call may be received. Illustratively, the indication may be received by the PCRF 114, and may be received from the IMS-ALG 126. In some embodiments, as described above, the indication may be a Diameter STR message having a cause code that indicates a dropped VoLTE call.

At block 354, a message may be transmitted to the PGW 112 indicating a dropped VoLTE call. Illustratively, the indication may be transmitted by the PCRF 114, and in some embodiments may be a RAR command containing an Event-Trigger AVP that indicates a dropped VoLTE call. At block 356, a message may be transmitted to the SGW 110 and/or the MME 108 indicating a VoLTE dropped call. In some embodiments, as described above, the message at block 356 may be a GTPv2-C Delete Bearer Request, which may contain a Cause value that indicates a VoLTE dropped call.

At block 358, an indication of a VoLTE dropped call may be transmitted to the eNB 106. In some embodiments, the indication may be an S1AP E-RAB Release Command having a cause code that indicates a VoLTE dropped call. One skilled in the art will appreciate, however, that the present disclosure is not limited to a particular message content, message format, or message protocol with regard to the messages and/or indications transmitted at blocks 354, 356, and 358. At block 360, resources associated with the VoLTE call may be released, and the dropped VoLTE call may be logged. In various embodiments, information regarding the VoLTE dropped call may be captured and stored, such as a date and time of the dropped call, call duration, calling and/or called parties, information regarding the user device, information regarding the eNB 106, or other diagnostic information. In further embodiments, a counter of VoLTE dropped call events may be incremented or maintained, and the eNB 106 may track and report a number of VoLTE dropped call events that occurred within a specified time period.

Figure 4:
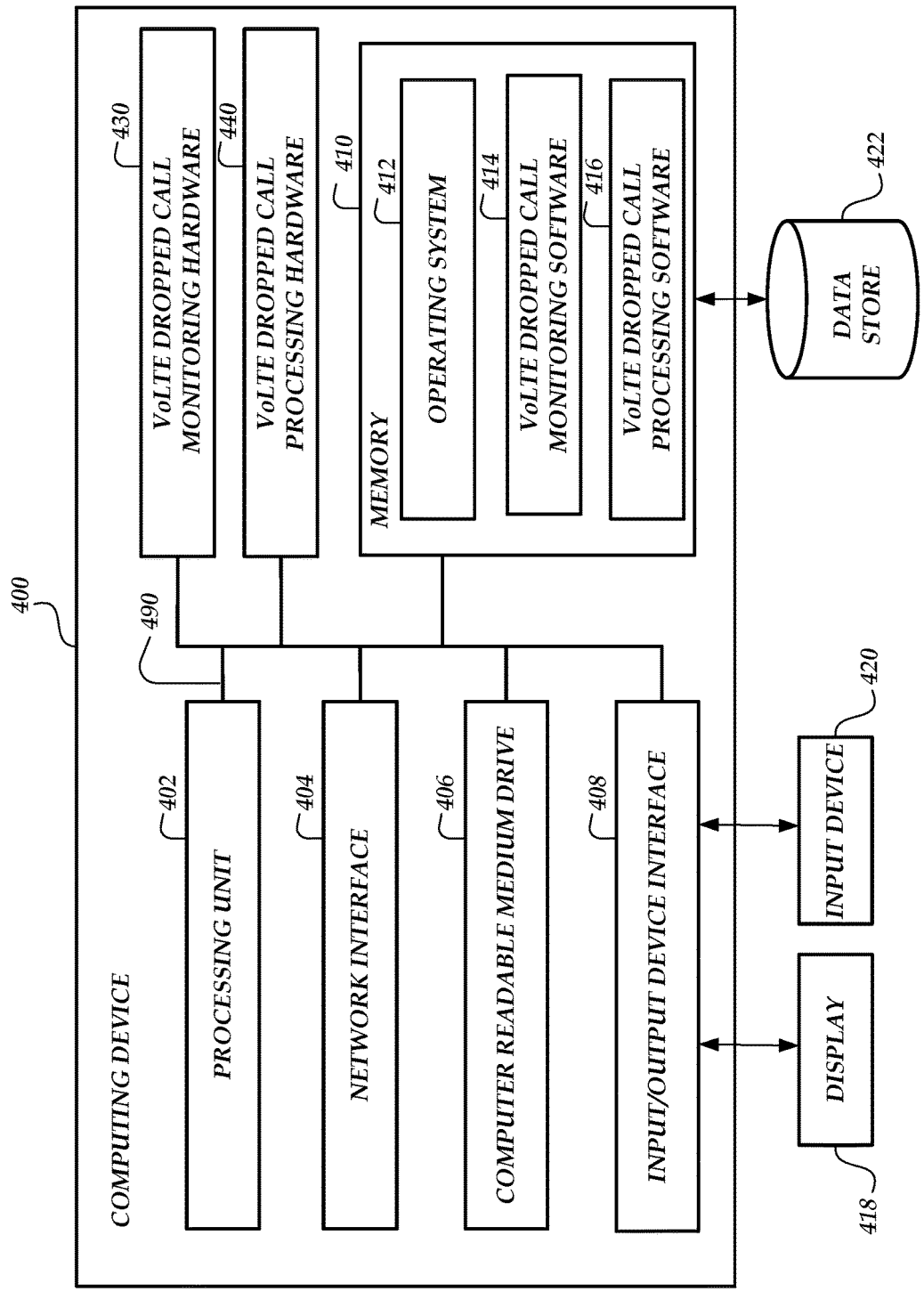
FIG. 4 an illustrative functional block diagram of a computing device for implementing VoLTE dropped call detection and processing in the network environment of FIG. 1.

FIG. 4 is an illustrative functional block diagram of a computing device 400 for implementing detection of dropped VoLTE calls in the network environment 100 of FIG. 1. The computing device 400 can be a server or other computing device, and can comprise a processing unit 402, a network interface 404, a computer readable medium drive 406, an input/output device interface 408, and a memory 410. The network interface 404 can provide connectivity to one or more networks (e.g., the network 104) or computing systems. The processing unit 402 can receive information and instructions from other computing systems or services via the network interface 404. The network interface 404 can also store data directly to the memory 410. The processing unit 402 can communicate to and from the memory 410 and output information to an optional display 418 via the input/output device interface 408. The input/output device interface 408 can also accept input from the optional input device 420, such as a keyboard, mouse, digital pen, microphone, mass storage device, etc.

The memory 410 contains computer program instructions that the processing unit 402 executes in order to implement one or more embodiments. The memory 410 generally includes RAM, ROM, and/or other persistent, non-transitory computer readable media. The memory 410 can store an operating system 412 that provides computer program instructions for use by the processing unit 402 or other elements included in the computing device in the general administration and operation of the computing device 400. The memory 410 can further include computer program instructions and other information for implementing aspects of the present disclosure. For example, in one embodiment, the memory 410 includes VoLTE dropped call monitoring software 414 and VoLTE dropped call processing software 416 that implements aspects of the present disclosure. The VoLTE dropped call monitoring software 414 and VoLTE dropped call processing software 416 may illustratively correspond to all or some of the components depicted in FIG. 1, or to implement some portion of the illustrative routines 300 and 350 of FIGS. 3A and 3B.

The computing device 400 may further comprise VoLTE dropped call monitoring hardware 430 and VoLTE dropped call processing hardware 440. The VoLTE dropped call monitoring hardware 430 and the VoLTE dropped call processing hardware 440 may illustratively implement aspects of the present disclosure, such as components of the network environment 100 depicted in FIG. 1, or relevant portions of the illustrative routines 300 and 350 of FIGS. 3A and 3B, respectively. In some embodiments, the VoLTE dropped call monitoring hardware 430 and the VoLTE dropped call processing hardware 440 may be implemented in part with the processing unit 402, the computer readable medium drive 406, or other elements of the computing device 400.

The elements included in the computing device 400 may be coupled by a bus 490. The bus 490 may be a data bus, communication bus, or other bus mechanism to enable the various components of the computing device 400 to exchange information. In some embodiments, the computing device 400 may include more or fewer components than are shown in FIG. 4. For example, a computing device 400 may include more than one processing unit 402 and computer readable medium drive 406. In another example, the computing device 400 may not be coupled to a display 418 or an input device 420. In still another example, the configuration management software 414, test management software 416, the VoLTE dropped call monitoring hardware 430 and the VoLTE dropped call processing hardware 440 may include various interdependent or independent subcomponents implementing different aspects of the present disclosure. In some embodiments, two or more computing devices 400 may together form a computer system for executing features of the present disclosure.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware (e.g., application-specific logic circuitry), computer software executed by hardware, or combinations of both. To clearly illustrate this interchangeability of hardware and software, various illustrative components, blocks, modules, and steps have been described above generally in terms of their functionality. Whether such functionality is implemented as hardware, or as software executed by hardware, depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a computing device, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for managing performance of a network that implements a Voice over Long Term Evolution (VoLTE) standard, the system comprising:

an IMS application level gateway (IMS-ALG) configured to:
receive, from an IMS access gateway (IMS-AGW), an indication that a Real-time Transfer Protocol (RTP) packet flow associated with a VoLTE call has stopped;
determine, based at least in part on the indication, that the VoLTE call has terminated abnormally; and
transmit, to a policy charging and rules function (PCRF), an indication that the VoLTE call terminated abnormally;

the PCRF, wherein the PCRF is configured to:
receive, from the IMS-ALG, the indication that the VoLTE call terminated abnormally; and
transmit, to a packet data network gateway (PGW), a re-auth request indicating that the VoLTE call terminated abnormally;

the PGW, wherein the PGW is configured to:
receive, from the PCRF, the re-auth request;
release one or more PGW resources dedicated to the VoLTE call; and
transmit, to a serving gateway (SGW), a delete bearer request having a cause code indicating that the VoLTE call terminated abnormally;

the SGW, wherein the SGW is configured to:
receive, from the PGW, the delete bearer request;
release one or more SGW resources dedicated to the VoLTE call; and
transmit, to a mobility management entity (MME), the delete bearer request;

the MME, wherein the MME is configured to:
receive, from the SGW, the delete bearer request;
release one or more MME resources dedicated to the VoLTE call; and
transmit, to an enhanced Node B (eNB), a release command indicating that the VoLTE call terminated abnormally; and the eNB, wherein the eNB is configured to:
receive, from the MME, the release command;

release one or more eNB resources dedicated to the VoLTE call; and log an abnormal VoLTE call termination event in an event log.

2. The system of claim 1 further comprising:
the IMS-AGW, wherein the IMS-AGW is configured to:
monitor the RTP packet flow associated with the VoLTE call, the RTP packet flow comprising upload packets received from a user device and download packets sent to the user device;
determine an elapsed time since at least one of receipt of an upload packet or receipt of a download packet;
determine, based at least in part on the elapsed time, that the RTP packet flow has stopped; and
transmit, to the IMS-ALG, the indication that the RTP packet flow has stopped.

3. The system of claim 1, wherein the indication that the VoLTE call terminated abnormally comprises a Session Termination Request (STR) command.

4. The system of claim 1, wherein the eNB is further configured to transmit information regarding the event log to a network performance monitoring function.

5. The system of claim 3, wherein the STR command comprises a Termination-Cause attribute-value pair.

6. The system of claim 3, wherein the STR command comprises an Experimental-Result-Code attribute-value pair.

7. The system of claim 4, wherein the information regarding the event log comprises a number of abnormal VoLTE call termination events logged within a specified time period.

8. A computer-implemented method comprising:
receiving, by an IMS application level gateway (IMS-ALG), a first indication from an IMS access gateway (IMS-AGW), the first indication indicating that a packet flow associated with a Voice over Long Term Evolution (VoLTE) call has stopped;
determining, by the IMS-ALG, based at least in part on the first indication, that the VoLTE call has terminated abnormally;
transmitting, by the IMS-ALG, a second indication to a policy charging and rules function (PCRF); and
transmitting, by the PCRF and at least one other network element, further indications that the VoLTE call terminated abnormally.

9. The computer-implemented method of claim 8, wherein the second indication comprises a Session Termination Request (STR) command.

10. The computer implemented method of claim 8, wherein transmitting by the PCRF and the at least one other network element, further indications that the VoLTE call terminated abnormally comprises:
transmitting, by the PCRF, a third indication to a packet data network gateway (PGW),
transmitting, by the PGW, a fourth indication to a serving gateway (SGW),
transmitting, by the SGW, a fifth indication to a mobility management entity (MME),
transmitting, by the MME, a sixth indication to an enhanced Node B (eNB), and storing, by the eNB, information regarding the VoLTE call in a data store,
wherein the second, third, fourth, fifth, and sixth indications indicate that the VoLTE call terminated abnormally.

11. The computer-implemented method of claim 8, wherein the packet flow is associated with a Session Initiation Protocol (SIP) session.

12. The computer-implemented method of claim 10, wherein the information regarding the VoLTE call that is stored in the data store by the eNB includes information indicating that the VoLTE call terminated abnormally.

13. The computer-implemented method of claim 10, wherein the third indication comprises a Re-Auth Request (RAR) command.

14. The computer-implemented method of claim 10, wherein the fourth indication comprises a Delete Bearer request.

15. The computer-implemented method of claim 10, wherein the fifth indication comprises a Delete Bearer request.

16. The computer-implemented method of claim 10, wherein the sixth indication comprises an E-UTRAN Radio Access Bearer (E-RAB) Release Command.

17. A non-transitory computer-readable medium storing computer-executable instructions that, when executed by a processor, cause the processor to perform operations comprising:
receiving a first indication regarding a packet flow associated with a Voice over Long Term Evolution (VoLTE) call;
determining, based at least in part on the first indication, that the VoLTE call has terminated abnormally; and
causing a plurality of network elements to transmit indications that the VoLTE call terminated abnormally, wherein causing the plurality of network elements to transmit indications that the VoLTE call terminated abnormally causes an enhanced Node B (eNB) to associate an abnormal call termination event with the VoLTE call.

18. The non-transitory computer-readable medium of claim 17, wherein the first indication is received from an IMS access gateway (IMS-AGW).

19. The non-transitory computer-readable medium of claim 17, wherein determining that the VoLTE call has terminated abnormally comprises determining that the packet flow has stopped for a duration exceeding a predetermined threshold.

20. The non-transitory computer-readable medium of claim 17, wherein the indications that the VoLTE call terminated abnormally include an E-UTRAN Radio Access Bearer (E-RAB) Release Command having a cause code indicating an abnormal call termination.

21. The non-transitory computer-readable medium of claim 17, wherein causing the plurality of network elements to transmit indications that the VoLTE call terminated abnormally further causes the eNB to release a resource associated with the VoLTE call.

* * * * *